Sept. 14, 1926.

W. C. TROUT

COUNTERBALANCE FOR PUMPING RIGS

Filed April 15, 1926

1,599,440

Walter C. Trout  Inventor

By Jesse R. Stone

Attorney

Patented Sept. 14, 1926.

1,599,440

UNITED STATES PATENT OFFICE.

WALTER C. TROUT, OF LUFKIN, TEXAS.

COUNTERBALANCE FOR PUMPING RIGS.

Application filed April 15, 1926. Serial No. 102,280.

My invention relates to counterbalances such as are employed on pumping rigs in deep well operations.

In pumping deep wells, the pump rod is usually reciprocated through a walking beam, one end of which is secured by means of a pitman to a crank shaft upon which a band wheel is secured. In the operation of the pump, the pump rod together with its load of fluid is raised on the upstroke and on the down stroke which follows the load drops with an abrupt jerk which places an undue strain upon the pumping rig. Counterbalances have been used both on the walking beam and upon the crank shaft to counterbalance the load exerted by the pump rods so as to overcome the jerk of the rods on the downward stroke.

It is an object of my invention to provide a weight which may be placed upon a crank arm shaped to receive it in such manner that it may be used as a counterbalance in pumping operations and quickly adjusted into a neutral position when the crank shaft is rotated in the operation of the hoisting drum ordinarily used about pumping rigs. The invention relates to the particular shape and mounting of the crank arm and its supported weight.

Figure 1:
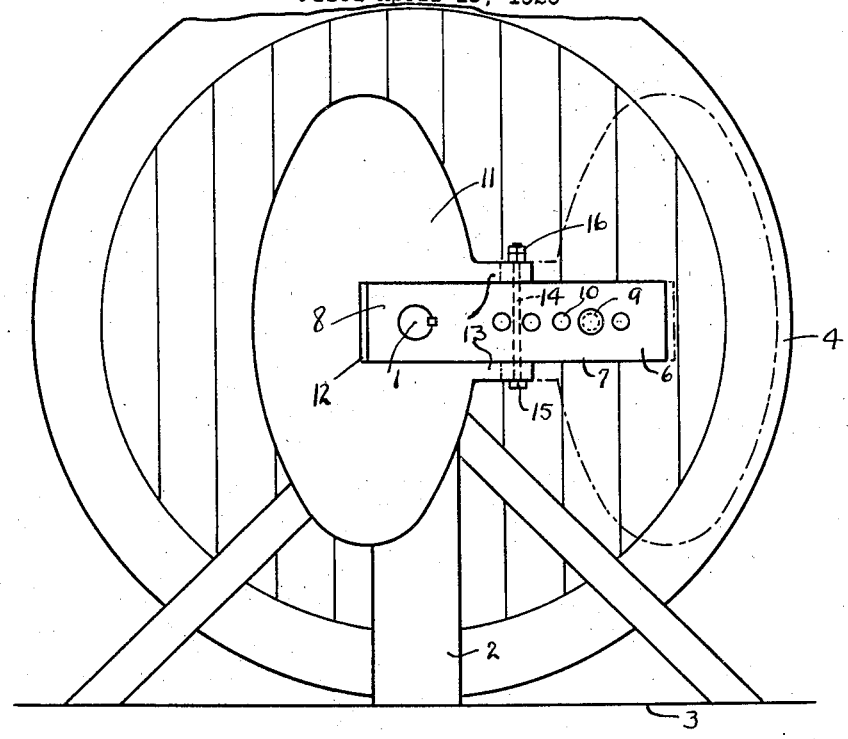
Figure 2:
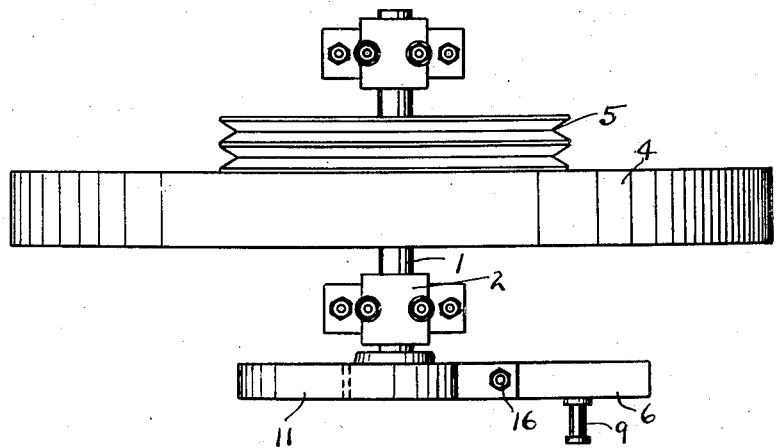

Referring to the drawing herewith, wherein one embodiment of the invention is illustrated, Fig. 1 is a side elevation of a crank shaft with a band wheel and crank arm thereon to which my invention is applied. Fig. 2 is a top plan view of the same.

I have shown the invention as employed upon a crank shaft 1 mounted in bearings at the upper end of the jack post 2 supported upon the base 3. The crank shaft has a band wheel 4 of ordinary construction thereon to receive a belt through which the device may be driven. The pulleys 5 on the shaft adjacent the band wheel serve to receive belts or cables for connection with another operative device, such as the hoisting drum.

The crank shaft 1 has a crank arm 6 upon one end thereof, said crank arm being shaped to co-operate with my invention. It is, therefore, shown as approximately rectangular in shape having a long arm 7 on one side of the shaft and a shorter arm 8 on the opposite side of the shaft. A wrist pin 9 is adapted to be adjusted along the crank arm in any selected one of the holes 10 formed in the arm.

The balance weight employed upon the crank arm is shown at 11. It may be of any desired shape, but I have shown it as being approximately oval in shape having a slot or recess 12 extending from the center thereof laterally. The sides of the slot 12 are extended to provide two lateral arms 13 adapted to fit on opposite sides of the crank arm 7. These two arms 13 have openings therethrough registering with a transverse opening 14 in the crank arm to receive a bolt 15 which acts as a pivot upon which the weight may swing. The opening 14 in the crank arm is formed midway between the ends of the crank arm and as the crank arm is of uniform width, the weight 11 may be swung into a position on the short end of the crank arm, as shown in full lines in the drawing where it has a neutral or balancing effect upon the shaft, the crank arm and the weight together upon the shaft being then approximately balanced. When it is desired to use the weight as a counterbalance for the load of the pump rods, the weight may be swung into the dotted line position shown in Fig. 1, and when fixed in this position, it will act as a counterbalance in the manner described. It is contemplated that the weight will be held in either of the positions indicated by clamping the bolt 15 through the use of nuts 16 thereon. Any additional means for fixing the weight in adjusted position may be employed, if desired.

The advantages of this type of counterbalance lie in the fact that it may be quickly secured in position upon the crank arm and easily adjusted from a neutral position to a counterbalancing position when necessary. It is simple in construction and economical to manufacture.

Having thus described my invention, what I claim as new and desire to protect by Letters Patent is:—

1. In a device of the character described, a crank shaft, a crank arm thereon, and a weight pivoted midway of said arm and adapted to be swung on said pivot into counterbalancing position at the end of said arm, or into neutral position adjacent said shaft.

2. In a device of the character described, a crank shaft, a crank arm thereon, a weight having a lateral recess fitting the end of said arm, means to pivot said weight midway of the ends of said arm, said arm being adapted to swing on said pivot into position at either end of said arm.

3. In a device of the character described, a crank shaft, a crank arm thereon, said arm being approximately rectangular in shape and secured to said shaft adjacent the end of said arm, a weight having a lateral recess to receive said arm, and means securing said weight pivotally to said arm at point midway thereof, whereby said weight may be swung to position at either end of said arm.

4. In a device of the character described, a crank shaft, a crank arm thereon, means to rotate said shaft, said arm having parallel forward and rearward sides, a weight having a lateral recess to fit said crank arm, means at the outer end of said recess to attach said weight midway of said arm, whereby said weight may be swung into neutral or counterbalancing position as desired.

5. In a device of the character described, a crank shaft, a crank arm thereon extending unequal distances on opposite sides of the shaft, a weight pivoted midway of the ends of said arm and adapted to swing on said pivot to a position at either end of said arm.

In testimony whereof I hereunto affix my signature this 9th day of March, A. D. 1926.

WALTER C. TROUT.